No. 842,352. PATENTED JAN. 29, 1907.
C. F. STODDARD.
CARRIER FOR PNEUMATIC DESPATCH APPARATUS.
APPLICATION FILED MAY 17, 1904.
2 SHEETS—SHEET 1.
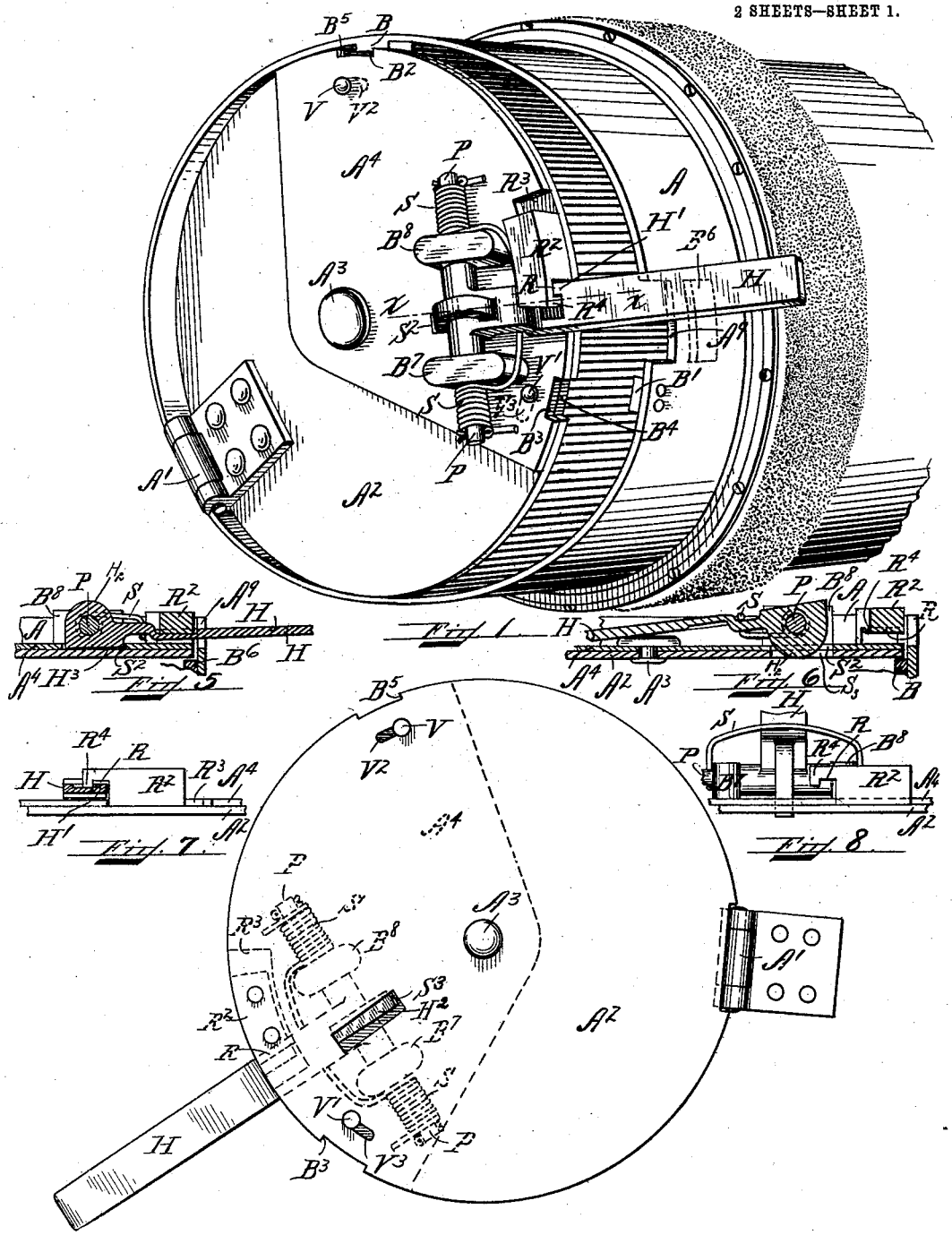

No. 842,352. PATENTED JAN. 29, 1907.
C. F. STODDARD.
CARRIER FOR PNEUMATIC DESPATCH APPARATUS.
APPLICATION FILED MAY 17, 1904.

2 SHEETS—SHEET 2.

UNITED STATES PATENT OFFICE.

CHARLES F. STODDARD, OF BOSTON, MASSACHUSETTS, ASSIGNOR TO AMERICAN PNEUMATIC SERVICE COMPANY, OF DOVER, DELAWARE, A CORPORATION OF DELAWARE.

CARRIER FOR PNEUMATIC-DESPATCH APPARATUS.

No. 842,352.　　　Specification of Letters Patent.　　　Patented Jan. 29, 1907.

Application filed May 17, 1904. Serial No. 208,369.

*To all whom it may concern:*

Be it known that I, CHARLES F. STODDARD, of Boston, in the county of Suffolk and State of Massachusetts, have invented certain new and useful Improvements in Carriers for Pneumatic-Despatch Apparatus, of which the following is a specification.

My invention relates to new and useful improvements in carriers for pneumatic-despatch-tube apparatus, and especially to means for preventing the operation of the locking mechanism except when the cover is in proper locking position on the shell.

My invention also relates to means whereby the carrier cannot be inserted into the despatch-tube until the cover is locked to the shell of the carrier.

My invention further relates to means for preventing the movement of the locking mechanism after the cover is locked to the shell of the carrier and the carrier placed in the despatch-tube.

My invention consists of certain novel features hereinafter described, and particularly pointed out in the claims.

Figure 3:
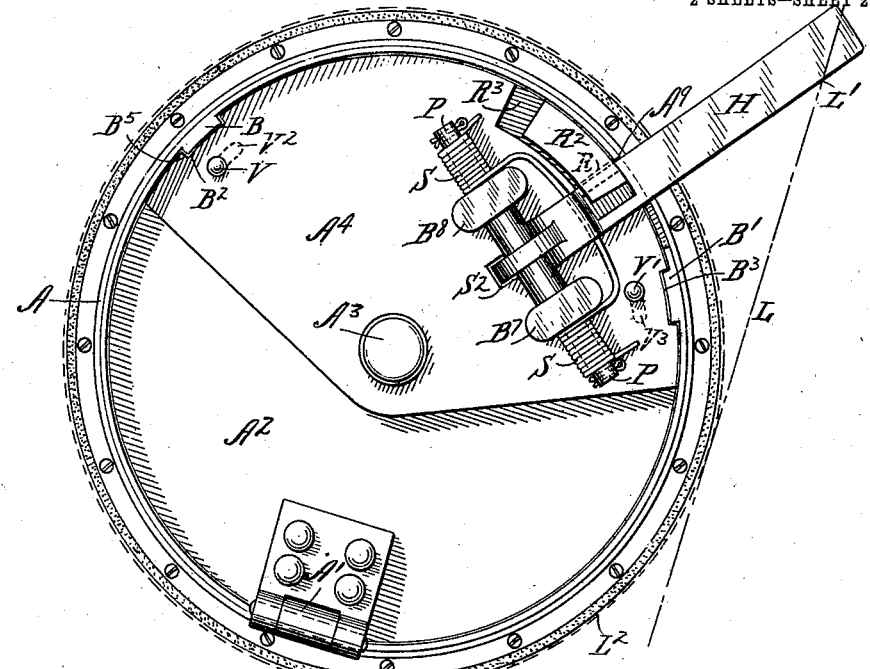
Figure 4:
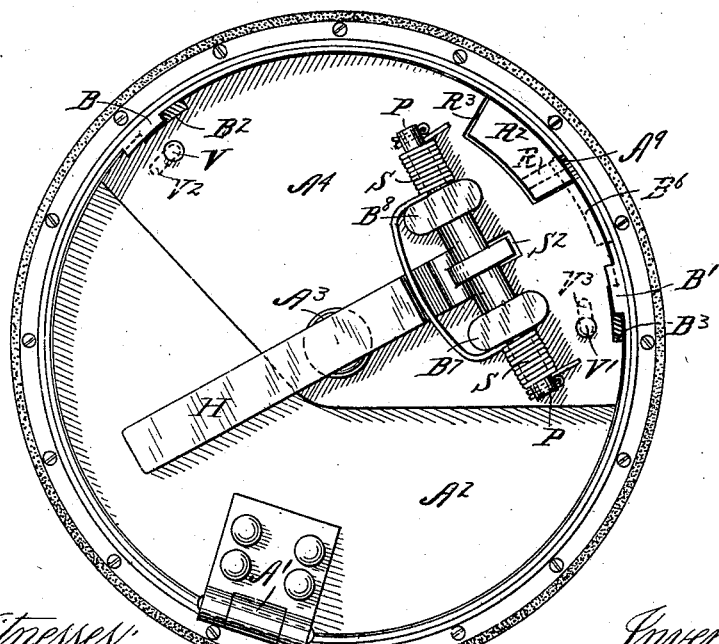

In the accompanying drawings, which illustrate a construction embodying my invention, Figure 1 is a perspective view of the end of the carrier, showing the cover unlocked and ajar. Fig. 2 is a view of the under side of the cover in its unlocked position. Fig. 3 is a plan view of the cover closed but unlocked. Fig. 4 is a plan view of the cover closed and locked. Fig. 5 is a detail section through the safety mechanism on the line $x$ $x$, Fig. 1. Fig. 6 is a similar detail view with the handle in the position shown in Fig. 4. Fig. 7 is a detail view of the safety mechanism with the handle in the position shown in Fig. 3. Fig. 8 is a detail view showing the handle partly swung over after the cover has been locked.

Like letters of reference refer to like parts throughout the several views.

A represents the shell of the carrier, to which is hinged at A' the cover $A^2$. At the center $A^3$ of this cover $A^2$ is pivoted the plate $A^4$, so that it may swing around the center $A^3$ a short distance. To the shell A is securely fastened one or more lugs B B', which project into the interior of the shell A. The plate $A^4$ is provided with one or more recesses $B^2$ $B^3$, which when the carrier is unlocked are directly above the similar recesses $B^4$ $B^5$ in the cover $A^2$. When the cover is closed, these recesses $B^2$ $B^3$ $B^4$ $B^5$ allow the cover $A^2$ and the plate $A^4$ to swing down past the lugs B B' until the cover strikes the stop $B^6$. (Shown in Figs. 5 and 6.) The depth of the lugs B B' is such that when the cover $A^2$ strikes the stop $B^6$ the top of the plate $A^4$ will be slightly below the bottom of the lugs B B', so that when the plate $A^4$ is swung into the position shown in Fig. 4 part of said plate $A^4$ adjacent to the recesses $B^2$ and $B^3$ will swing under the lug B and lug B', thereby locking the cover closed.

The handle H swings on the pin P, which is secured to the plate $A^4$ by the blocks $B^7$ $B^8$. The torsion-spring S has a tendency to hold the handle H in the position shown in Fig. 4, and when the handle H is in the position shown in Figs. 1 and 3 the torsion-spring S keeps the shoulder H' on the handle H pressed up into the recess R of the block $R^2$, which is securely fastened to the cover $A^2$ and projects up through the opening $R^3$ in the plate $A^4$. The handle H is constructed with a web $H^2$, which when said handle H is in the position shown in Figs. 4 and 6 reaches down into the slots $S^2$ and $S^3$ of the plate $A^4$ and the cover $A^2$, respectively, but on account of one side $H^3$ of the web $H^2$ being flat said web $H^2$ does not reach into the slot $S^3$ of the cover $A^2$ when the handle H is in the position shown in Figs. 3 and 5. This allows the plate $A^4$ to be turned on the center $A^3$ only when the handle H is in the position shown in Figs. 3 and 5, and this precludes any possibility of the plate $A^4$ becoming disengaged from the lugs B B' until the handle H is swung into the position shown in Fig. 5, and the handle H cannot be swung into the position shown in Fig. 5 while the carrier is in the despatch-tube, because it protrudes beyond the peripheral limits of the carrier, and would therefore strike the inside of the tube. When the cover is opened after the handle H is swung under the overhanging portion $R^4$ of the block $R^2$, the spring S holds the handle H in the position shown in Fig. 7, which brings the shoulder H' into the recess R, thereby making it impossible under ordinary conditions for the handle H to be swung out from under the overhanging portion $R^4$ of the block $R^2$ until the cover A² is closed. This under ordinary conditions keeps the handle H in the position shown in Fig. 1 all the time the cover is open, and as the handle H is set at an incline to the plane in which the cover A² swings, as shown in Fig. 3, (where L shows the projection of the line of travel of the point L' on the handle H when the cover is raised,) the carrier cannot ordinarily be inserted into the transmission-tube with the cover unlocked. The dotted line L² represents the bore of the transmission-tube, Fig. 3, and as the line L tangent to the line L² and the end of the handle H beyond the point L' is outside of the line L², no matter in what position the cover A² may be, part of the handle H will always protrude beyond the peripheral limits of the carrier, which makes it impossible to insert the carrier into the transmission-tube while the handle H is in the position shown in Fig. 3, which is the necessary position of the handle H in opening the cover A².

The operation of the cover is as follows: Starting with the carrier closed and locked, as in Fig. 4, the handle H is swung over until the lower side, Fig. 5, comes into contact with the upper side of the plate A⁴. The handle H is then pushed under the overhanging portion R⁴ of the block R² into the position shown in Fig. 7, which brings the relative positions of the plate A⁴ and the cover A² like that shown in Fig. 3, and the swinging of the handle H under the overhanging portion R⁴ of the block R² turns the plate A⁴, so that the recesses B² B³ are brought in line with the recesses B⁵ B⁴, thereby unlocking the cover. The cover A² is then raised by means of the handle H, which is held in this position under the overhanging portion R⁴ of the block R², as above explained, until the cover is closed, which is accomplished by the handle H. As the cover A² reaches the stop B⁶, Fig. 6, the pressure of the handle H disengages the shoulder H' from the recess R and allows the handle to be swung out from under the overhanging portion R⁴ of the block R², as shown in Fig. 8. The spring S then throws the handle H into the position shown in Fig. 4, thereby locking the plate A⁴ and the cover A² together, as shown in Fig. 6, which completes the cycle of operation. The rivets V V' are securely fastened to the plate A⁴ and swing in the slots V² V³ in the cover A² and are the means of holding the plate A⁴ in juxtaposition to the cover A² near the points where the cover A² is held locked to the shell A. The shell A is cut at A⁹ to allow room for the handle when the cover A² is closed.

I do not limit myself to the arrangement and construction shown, as the same may be varied without departing from the spirit of my invention.

Having thus described the nature of my invention and set forth a construction embodying the same, what I claim as new, and desire to secure by Letters Patent of the United States, is—

1. In a carrier for pneumatic-despatch-tube apparatus, a cover, locking mechanism pivoted on said cover, a lever for operating said locking mechanism, means on the shell of the carrier with which said locking mechanism engages for locking the cover to the shell of the carrier, a spring for holding said lever within the periphery of the carrier when the cover is locked to the shell of the carrier and means for holding said lever against the action of said spring outside of the periphery of the shell when the cover is unlocked.

2. In a carrier for pneumatic-despatch-tube apparatus, a cover, locking mechanism pivoted on said cover, a lever for operating said locking mechanism, means on the shell of the carrier with which said locking mechanism engages for locking the cover to the shell of the carrier, a spring acting on said lever for holding said lever within the periphery of the carrier when the cover is locked to the shell of the carrier and means for holding said lever against the action of said spring outside of the periphery of the shell when the cover is unlocked.

3. In a carrier for pneumatic-despatch-tube apparatus, a cover, locking mechanism pivoted on said cover, a lever for operating said locking mechanism, means on the shell of the carrier with which said locking mechanism engages for locking the cover to the shell of the carrier, a spring acting on said lever for holding said lever within the periphery of the carrier when the cover is locked to the shell of the carrier, and means engaging with said lever for holding the same against the action of said spring beyond the periphery of the carrier when the cover is unlocked from the shell of the carrier.

4. In a carrier for pneumatic-despatch-tube apparatus, a cover, a plate pivoted on said cover, a lever pivoted to said plate for operating the same, lugs on the shell of the carrier with which said plate engages for locking the cover to the shell of the carrier, a spring for holding said lever within the periphery of the carrier when the cover is locked to the shell of the carrier and means for holding said lever against the action of said spring outside of the periphery of the shell when the cover is unlocked.

5. In a carrier for pneumatic-despatch-tube apparatus, a cover, a plate pivoted on said cover, a lever pivoted to said plate for operating the same, lugs on the shell of the carrier with which said plate engages for locking the cover to the shell of the carrier, a spring acting on said lever for holding said lever within the periphery of the carrier when the cover is locked to the shell of the carrier and means for holding said lever against the action of said spring outside of the periphery of the shell when the cover is unlocked.

6. In a carrier for pneumatic-despatch-tube apparatus, a cover, a plate pivoted on said cover, a lever pivoted to said plate for operating the same, lugs on the shell of the carrier with which said plate engages for locking the cover to the shell of the carrier, a spring acting on said lever for holding said lever within the periphery of the carrier when the cover is locked to the shell of the carrier, and means engaging with said lever for holding the same against the action of said spring beyond the periphery of the carrier when the cover is unlocked from the shell of the carrier.

In testimony whereof I have signed my name to this specification, in the presence of two subscribing witnesses, this 14th day of May, A. D. 1904.

CHARLES F. STODDARD.

Witnesses:
A. L. MESSER,
A. R. LARRABEE.